United States Patent
Wang et al.

(10) Patent No.: US 7,813,383 B2
(45) Date of Patent: *Oct. 12, 2010

(54) METHOD FOR TRANSMISSION OF TIME DIVISION MULTIPLEXED PILOT SYMBOLS TO AID CHANNEL ESTIMATION, TIME SYNCHRONIZATION, AND AGC BOOTSTRAPPING IN A MULTICAST WIRELESS SYSTEM

(75) Inventors: Michael Mao Wang, San Diego, CA (US); Bojan Vrcelj, San Diego, CA (US); Krishna Kiran Mukkavilli, San Diego, CA (US); Raghuraman Krishnamoorthi, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 821 days.

This patent is subject to a terminal disclaimer.

(21) Appl. No.: 11/372,930

(22) Filed: Mar. 9, 2006

(65) Prior Publication Data

US 2006/0250937 A1 Nov. 9, 2006

Related U.S. Application Data

(60) Provisional application No. 60/660,907, filed on Mar. 10, 2005.

(51) Int. Cl.
 *H04J 3/06* (2006.01)
(52) U.S. Cl. ................... 370/503; 370/510; 370/511

(58) Field of Classification Search ............... 370/464, 370/498, 500; 375/E7.001, E7.026
See application file for complete search history.

(56) References Cited

U.S. PATENT DOCUMENTS

| 6,005,605 A | 12/1999 | Kostreski et al. |
| 6,256,508 B1 | 7/2001 | Nakagawa et al. |
| 6,317,470 B1 | 11/2001 | Kroeger et al. |
| 6,675,022 B2 | 1/2004 | Burgan et al. |
| 6,747,948 B1 | 6/2004 | Sarraf et al. |

(Continued)

FOREIGN PATENT DOCUMENTS

EP 0656702 6/1995

(Continued)

OTHER PUBLICATIONS

International Search Report—International Search Authority—European Patent Office—PCT/US06/008954—DOM: Jul. 11, 2006.
R. Van Nee. R. Prasad: "OFDM for Wireless Multimedia Communications" Jan. 1, 2000, Artech House, Boston, USA, XP002387118 Paragraph [5.2.1].

(Continued)

*Primary Examiner*—Chi H Pham
*Assistant Examiner*—Fan Ng
(74) *Attorney, Agent, or Firm*—Gerald P. Joyce, III

(57) ABSTRACT

Systems and methods are provided for the transmission of waveforms. The method includes inserting at least one TDM pilot symbol located at a transition between wide area and local area waveforms to facilitate decoding of the transmission block.

25 Claims, 10 Drawing Sheets

U.S. PATENT DOCUMENTS

| | | | |
|---|---|---|---|
| 7,236,554 B2 * | 6/2007 | Gupta | 375/355 |
| 7,391,828 B2 | 6/2008 | Liu et al. | |
| 7,430,430 B2 * | 9/2008 | Li et al. | 455/522 |
| 2004/0181403 A1 * | 9/2004 | Hsu | 704/230 |
| 2004/0203789 A1 * | 10/2004 | Hammond et al. | 455/440 |
| 2004/0258024 A1 * | 12/2004 | Tiedemann et al. | 370/332 |
| 2005/0122928 A1 * | 6/2005 | Vijayan et al. | 370/312 |
| 2007/0211765 A1 | 9/2007 | Vrcelj et al. | |

FOREIGN PATENT DOCUMENTS

| | | |
|---|---|---|
| EP | 1244234 | 9/2002 |
| KR | 1020050061559 | 6/2005 |
| WO | 9941854 | 8/1999 |
| WO | 2006015268 | 2/2006 |

OTHER PUBLICATIONS

TIA TR47: "Forward Link Only Air Interface Specification Rev. 1.1"[Online] XP002387062 Retrieved From the Internet: URL:HTTP://FTP.TIAONLINE.ORG/TR-47/TR471/WORKING/20060110-ARLINGTON-MEETING1/TR471-20060110-004A_FLO%20AIS.PDF> [Retrieved on Jun. 26, 2006] the Whole Document.

"cdma2000 High Rate Packet Data Air Interface Specification," 3GGP2 C.S0024-A V.1.0, Mar. 1, 2004, pp. 13-46, XP000863923.

QUALCOMM Incorporated: "Detailed Description of the Enhanced BCMCS Transmit Waveform Description," C30-20040823-060, Aug. 23, 2004, XP000863922.

Written Opinion - PCT/US06/008954, International Searching Authority - European Patent Office, Jul. 11, 2006.

* cited by examiner

METHOD FOR TRANSMISSION OF TIME DIVISION MULTIPLEXED PILOT SYMBOLS TO AID CHANNEL ESTIMATION, TIME SYNCHRONIZATION, AND AGC BOOTSTRAPPING IN A MULTICAST WIRELESS SYSTEM

CROSS REFERENCE TO RELATED APPLICATION

This application claims the benefit of U.S. Provisional Patent Application Ser. No. 60/660,907 filed on Mar. 10, 2005, entitled "TDM Pilot III for Padme" the entirety of which is incorporated herein by reference.

BACKGROUND

I. Field

The subject technology relates generally to communications systems and methods, and more particularly to systems and methods that perform enhanced time synchronization and channel estimation in accordance with wireless networks.

II. Background

Orthogonal frequency-division multiplexing (OFDM) is a method of digital modulation in which a signal is split into several narrowband channels at different frequencies. These channels are sometimes called subbands or subcarriers. The technology was first conceived during research into minimizing interference among channels near each other in frequency. In some respects, OFDM is similar to conventional frequency-division multiplexing (FDM). The difference lies in the way in which the signals are modulated and demodulated. Generally, priority is given to minimizing the interference, or crosstalk, among the channels and symbols comprising the data stream. Less importance is placed on perfecting individual channels.

In one area, OFDM has also been used in European digital audio broadcast services. The technology lends itself to digital television, and is being considered as a method of obtaining high-speed digital data transmission over conventional telephone lines. It is also used in wireless local area networks. Orthogonal Frequency Division Multiplexing can be considered an FDM modulation technique for transmitting large amounts of digital data over a radio wave where OFDM operates by splitting a radio signal into multiple smaller subsignals or sub-carriers that are then transmitted simultaneously at different frequencies to the receiver. One advantage of OFDM technology is that it reduces the amount of crosstalk in signal transmissions where current specifications such as 802.11a WLAN, 802.16 and WiMAX technologies employ various OFDM aspects.

In some systems deploying OFDM technology, transmissions are intended for many users simultaneously. One such example is a broadcast or multicast system. Further, if different users can choose between different portions of the same transmission, the data in each transmission is typically time division multiplexed (TDM). It is often the case that the data intended for transmission is organized into fixed structures such as frames or superframes. Different users can then choose to receive different portions of a superframe at any given time. In order to assist the multitude of users with synchronization to the timing and frequency of the broadcast signal, time division multiplexed (TDM) pilot symbols are sometimes inserted at the beginning of each superframe. In one such case, each superframe begins with a header consisting, among other things, of two TDM pilots, called TDM pilot 1 and TDM pilot 2. These symbols are used by the system to achieve initial frame synchronization, also called initial acquisition.

In order to further assist with time and/or frequency synchronization during a superframe, also called time or frequency tracking, additional pilot symbols may be used. Time and frequency tracking may be achieved using the frequency division multiplexed (FDM) pilots, which may be embedded in each transmitted data OFDM symbol. For instance, if each OFDM symbol consists of N subcarriers, N-P of them can be used for data transmission and P of them can be assigned to FDM pilots. These P FDM pilots are sometimes uniformly spread over the N subcarriers, so that each two pilots are separated by N/P-1 data subcarriers. Such uniform subsets of subcarriers within an OFDM symbol are called interlaces.

Time domain channel estimates are used for time tracking during a superframe. Time domain channel estimates are obtained from FDM pilots, embedded in data OFDM symbols. The FDM pilots can be always placed on the same interlace, or they can occupy different interlaces in different OFDM symbols. The subset of subcarriers with indices i+8k is sometimes called the $i^{th}$ interlace. In this instance, N/P=8. In one case, the FDM pilots can be placed on interlace 2 during one OFDM symbol, on interlace 6 during the following symbol, then back on interlace 2 and so forth. This is called (2,6) staggering pattern. In other instances, the pilot staggering pattern can be more complicated, so that the occupied interlaces describe the pattern (0,3,6,1,4,7,2,5). This is sometimes called the (0,3,6) staggering pattern. Different staggering patterns make it possible for the receiver to obtain channel estimates longer than P time-domain taps. For example, (2,6) staggering pattern can be used at the receiver to obtain channel estimates of length 2P, while (0,3,6) staggering pattern can lead to channel estimates of length 3P. This is achieved by combining the channel observations of length P from consecutive OFDM symbols into a longer channel estimate in a unit called the time filtering unit. Longer channel estimates in general may lead to more robust timing synchronization algorithms.

Some broadcast systems are intended for different types of transmission simultaneously. For example, some of the broadcast data may be intended for any potential user within the national network, and such data is called national or wide area-area content. Other data symbols transmitted on the network may be intended only for users currently residing in a specific, local portion of the network. Such data is called local-area content. The data OFDM symbols, belonging to different contents may be time division multiplexed within each frame in a superframe. For example, certain portions of each frame within a superframe may be reserved for wide area content and the other portions for local area content. In such cases, the data and pilots intended for different contents can be scrambled using different methods. Moreover, the set of transmitters that are simultaneously broadcasting the wide area and the local area content within a superframe can be different. It is therefore quite common that the time domain channel estimates, as well as channel observations, associated with wide area content and those associated with local area content can be quite different. In these scenarios, special strategy needs to be deployed for channel estimation on OFDM symbols grouped near the boundary between the wide area and local area content. A special waveform needs to be transmitted to aid time tracking and channel estimation before and after the content boundary.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Enhanced broadcast techniques and transmission protocols are provided for a wireless network. In an embodiment, at least one additional Time Domain Multiplexed (TDM) pilot symbol is added to a broadcast symbol set (e.g., set including TDM1 and TDM2) at regular or determined intervals within a super frame broadcast. In this case, a TDM3, TDM4 and so forth pilot symbols may be added to an existing pilot set to mitigate timing and estimation problems within an Orthogonal Frequency Division Multiplexing (OFDM). Similar to TDM Pilot 2, TDM Pilot 3 (or symbol subset) can be designed to provide timing synchronization and channel estimation except that TDM Pilot 2 is limited for Wide area channel and TDM Pilot 3 can be employed for either wide area or local area channel depending on the position in a super frame. The structure of the TDM pilot 3 may be different from the structure of TDM pilot 2. If the TDM Pilot 3 (or other additional pilots) is located between a transition from wide area content to local area content in the super frame, it can be utilized for wide area channel estimation or local area channel estimation and timing. If the TDM Pilot 3 is located at the transition from local area to wide area, it can be used for local area channel estimation or wide area timing and channel estimation. In an embodiment, a method is provided for broadcasting OFDM information. The method includes determining at least one new TDM pilot symbol in addition to a TDM1 symbol and a TDM2 symbol and inserting the new TDM pilot symbol between at least two data boundaries of an OFDM packet to facilitate decoding of an OFDM transmission block.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Figure 1:
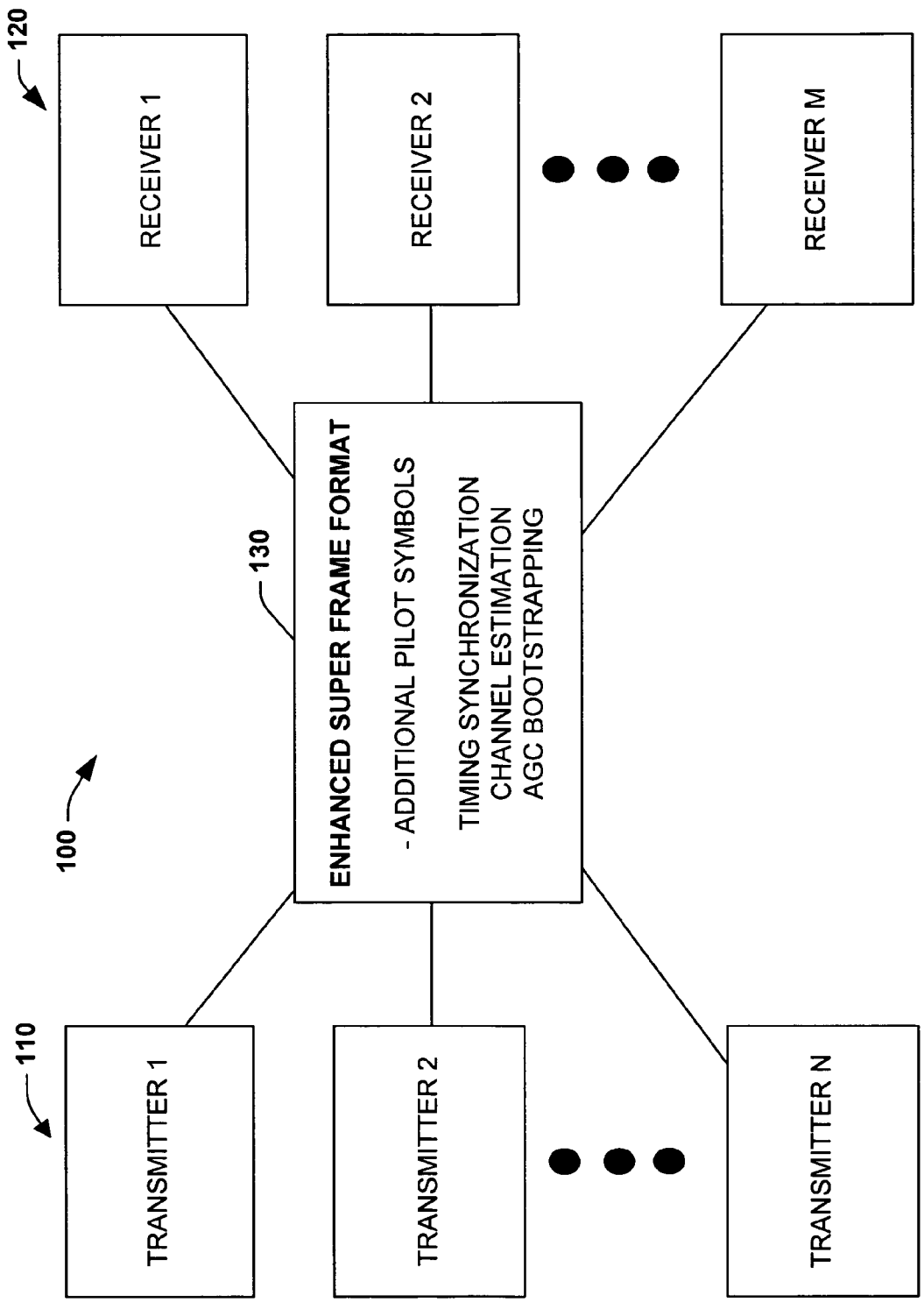
FIG. 1 is a schematic block diagram illustrating a wireless communications network employing an enhanced super frame structure.

Systems and methods are provided for channel estimation, timing synchronization, and AGC bootstrapping in a wireless network. In one embodiment, a method is provided for channel estimation, time-synchronization, and AGC bootstrapping in a Multicast Wireless System using Time-Division Multiplexed. (TDM) Pilot Symbols. The method includes determining at least one new TDM pilot symbol in addition to a TDM1 symbol and a TDM2 symbol. This also includes inserting the new TDM pilot symbol between at least two frames of an OFDM broadcast to facilitate decoding of an OFDM transmission block. The new TDM pilot symbol can be employed for channel estimation, time synchronization, and for automatic gain control (AGC) bootstrapping among other aspects.

As used in this application, various wireless communications terms are employed. For wireless transmission, on transmitted packet structure can include an Orthogonal Frequency Division Multiplexing (OFDM) symbol that consists of 4642 time-domain base-band samples called OFDM chips. Among these OFDM chips are 4096 data and pilot chips, originating from 4096 data and pilot subcarriers in the frequency domain. These chips are cyclically extended on each side, with 529 cyclically extended chips preceding the useful portion and 17 following the useful portion. To reduce the OFDM signal's out-band energy, the first 17 chips and the last 17 chips in an OFDM symbol have a raised cosine envelope. The first 17 chips of an OFDM symbol overlap with the last 17 chips of the OFDM symbol that precede them. As a result, the time duration of each OFDM symbol is 4625 chips long.

In one transmission data packet example, data can be generally organized into super frames, where each super frame has a one second duration. A super frame consists of 1200 symbols that are OFDM modulated with 4096 sub-carriers. With respect to sub-carriers, an interlace refers to a subset of sub-carriers spaced by a certain amount (e.g., spacing of 8). For example, 4096 sub-carriers could be divided into 8 interlaces, where the subcarriers in the $i^{th}$ interlace are those with indeces 8k+i. Among the 1200 OFDM symbols in a super frame, there are: Two TDM pilot symbols (TDM1, TDM2); One wide-area and 1 local area identification channel (WIC and LIC) symbols; Fourteen overhead information symbols (OIS) channel symbols; A variable number of two, six, 10, or 14 pilot positioning symbols (PPC) symbols for assisting with position location; A certain number of Transitional Pilot Channel (TPC) symbols, or TDM 3 pilots, which are located on each boundary between wide area and local area content data; and the remaining symbols are used for broadcast of either wide area or local area content. Each superframe consists of four data frames, as well as overhead symbols.

Time Division Multiplexing (TDM) Pilot Symbol 1 (TDM1) is the first OFDM symbol of each super frame, where TDM1 is periodic and has a 128 OFDM chip period. The receiver uses TDM1 for frame synchronization and initial time (course timing) and frequency acquisition. Following TDM1, are two symbols that carry the wide-area and local area IDs, respectively. The receiver uses this information to perform proper descrambling operations utilizing the corresponding PN sequences. Time division Multiplexing pilot Symbol 2 (TDM2) follows the wide-area and local area ID symbols, where TDM2 is periodic, having a 2048 OFDM chip period, and contains two and a fraction periods. The receiver uses TDM2 when determining accurate timing for demodulation.

Following TDM2 are: One wide-area TPC (WTPC) symbol; Five wide-area OIS symbols; Five wide-area FDM Pilot symbols; Another WTPC; One local area TPC (LTPC) symbol; Five local area OIS symbols; Five local-area FDM Pilot symbols; Another LTPC; and Four data frames follow the first 18 OFDM symbols described above. A data frame is subdivided into a wide-area data portion and a local area data portion. The wide-area content is pre-pended and appended with the wide-area TPC—one on each end. This arrangement is also used for the local area data portion. In this embodiment there is a total of 10 WTPC and 10 LTPC symbols per superframe.

In another embodiment, each transition between wide area and local-area content is associated with a single TPC pilot symbol. The structure of a unique TPC pilot, is different from the structure of WTPC or LTPC symbols, since a single pilot symbol is designed to meet both wide area and local-area channel estimation and synchronization requirements. In this embodiment there is a total of 10 or 11 TPC pilots (or TDM pilot 3 symbols) per superframe.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

FIG. 1 illustrates a wireless network system 100. The system 100 includes one or more transmitters 110 that communicate across a wireless network to one or more receivers 120. The receivers 120 can include substantially any type of communicating device such as a cell phone, computer, personal assistant, hand held or laptop devices, and so forth. The system 100 employs a plurality of enhanced super frame components 130 to facilitate various determinations in the system 100. In one embodiment, at least one additional Time Domain Multiplexed (TDM) pilot symbol is added to a broadcast symbol set at regular or determined intervals within a super frame broadcast depicted at 130. Thus, a TDM3, TDM4 (or more) pilot symbols may be added to an existing pilot set at 130 to mitigate timing and channel estimation problems within an Orthogonal Frequency Division Multiplexing (OFDM) network. Similar to TDM Pilot 2, inserting TDM Pilot 3 (or a set of TDM Pilot 3's) can provide timing synchronization and channel estimation except that TDM Pilot 2 is limited for Wide area channel where TDM Pilot 3 can be employed for either wide area or local area channel depending on the position in a super frame 130. If the TDM Pilot III (or other additional pilots) is located between a transition from wide area channel to local area channel in the super frame as will be described in more detail below, it can be utilized for wide area channel estimation or local area channel estimation and timing.

Figure 2:
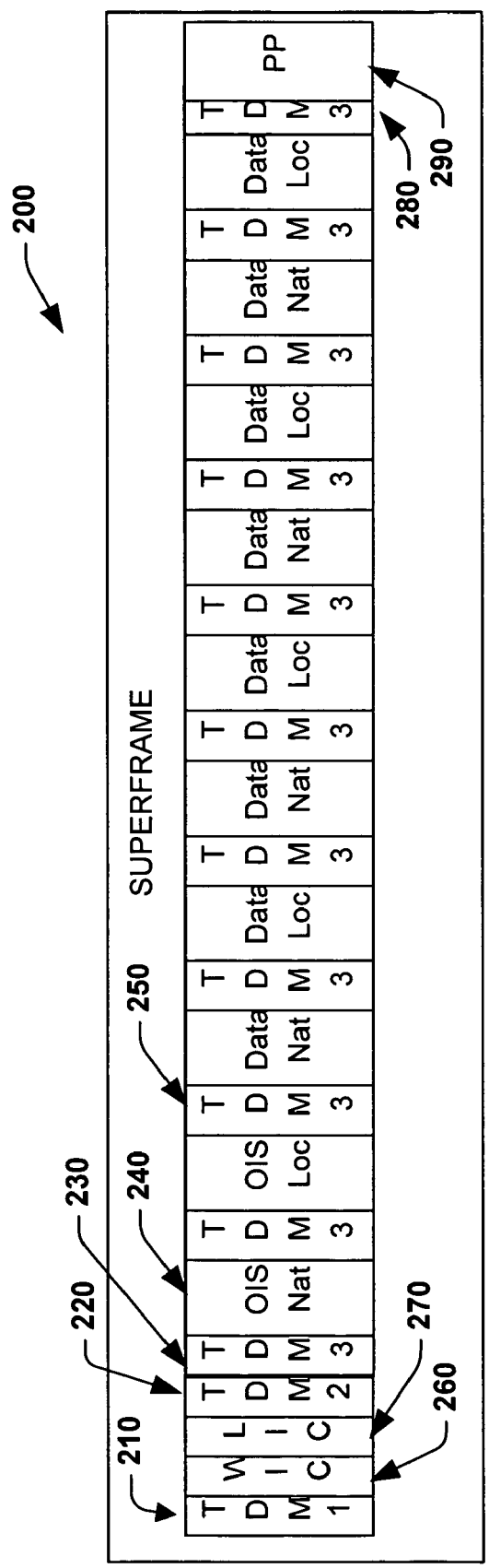
FIG. 2 illustrates an example super frame structure employing additional pilot symbols.

If the TDM Pilot 3 is located at the transition from local area to wide area, it can be used for local area channel estimation or wide area timing and channel estimation. In general, one or more new TDM pilots can be used at the transitions between local area and wide-area channels as will be described in more detail below. Some advantages of the new symbols include allowing operation of a time-filter in channel estimation at the boundary between local area and wide-area channels. Also, these new pilots in the super frame 130 facilitate timing synchronization for the first wide-area media logic channel (MLC) or the first local area MLC in each frame. Additionally, the system 100 can include a pilot symbol protocol for a wireless system. This can include means for determining at least one additional pilot symbol for a super frame, where the additional pilot symbol is in addition to TDM1 and TDM2 (e.g., reference numeral 130). Also, the protocol includes means for transmitting the super frame in the wireless network (e.g., reference 110) and means for receiving the super frame (e.g., reference 120) to determine wireless broadcast information FIG. 2 illustrates an example super frame structure 200. While only one additional pilot symbol—TDM3 is shown in the example super frame 200, it is to be appreciated that more than one additional pilot symbol may be employed. The super frame structure 200 introduces new OFDM symbols to facilitate the broadcasting of multiple wide area channels and multiple local area channels in a forward link only (FLO) network. The first OFDM symbol of a super frame is generally TDM Pilot 1 at 210, where the second OFDM symbol TDM Pilot 2 is illustrated at 220. This sequence is followed by a first TDM Pilot 3 at 230 followed by a wide area OIS (Overhead Information Symbols) at 240. Generally, a new, local area, TDM Pilot 3 symbol 230 can be inserted before the local area OIS symbols. This pattern generally repeats at all the junctions between wide area and local area channels such as at reference numeral 250 for example. However, it is noted that simpler processing may occur if a symbol subset having at least two symbols is placed at the boundaries between wide area and local area such as 250.

Similar to TDM Pilot 2 220, TDM Pilot 3 230 and so forth can have four null odd interlaces (1,3,5,7) where the even interlaces (0,2,4,6) are occupied by pilots. Unlike the TDM Pilot 2 220, TDM Pilot 3 230 can employ three of four even numbered interlaces for local area pilots and one for wide area if located in the transition from wide area to local area or three for wide area pilots and one for local area if the TDM Pilot III is located in the transition from local area to wide area. This holds in one embodiment where a single TPC pilot is deployed on each boundary. In another embodiment, with two TPC symbols per boundary, Local area Transitional Pilot Channel (LTPC) symbols have all even interlaces occupied by local area pilots, and wide area TPC (WTPC) symbols by wide-area pilots. As can be appreciated, other configurations for the super frame 200 are possible.

As a baseline, two hundred and ninety data symbols can be employed per frame 200. Two new OFDM symbols, a wide-area 260 and local area identification 270 channels (WIC & LIC) are introduced between TDM 1 and TDM 2 at the beginning of the super-frame 200. In the remaining part of the super-frame 200, e.g., 20 TDM 3 pilot symbols 250 are introduced. In general, TDM 3 consists of one or two OFDM symbols at each transition between wide-area and local area channels. There can be exceptions, however. There is only one TDM 3 symbol before the first wide-area OIS symbol (WOIS) and one at the end of the last frame, as indicated by the use of a shorter slice for TDM 3 as indicated at 230 and 280 if FIG. 2.

A new positioning pilot channel can be added at 290, and it includes P OFDM symbols at the end of the super-frame. The positioning pilots help in locating the receiver through triangulation methods.

TABLE 1

TDM pilot 3 locations, in embodiment with two TPC symbols per boundary
W: # of Wide-area symbols per frame, P positioning pilots

| Transition | Symbol Index for wide-area TDM3 symbol | Symbol Index for local area TDM3 symbol |
|---|---|---|
| TDM2 → W-OIS | 4 | — |
| W-OIS → L-OIS | 10 | 11 |

TABLE 1-continued

TDM pilot 3 locations, in embodiment with two TPC symbols per boundary
W: # of Wide-area symbols per frame, P positioning pilots

| Transition | Symbol Index for wide-area TDM3 symbol | Symbol Index for local area TDM3 symbol |
|---|---|---|
| L-OIS → W-Data | 18 | 17 |
| W-Data → L-Data | 19 + W + (F + 4) * i, (i = 0, 1, 2, 3) | 20 + W + (F + 4) * i, (i = 0, 1, 2, 3) |
| L-Data → W-Data | 18 + (F + 4) * i, (i = 1, 2, 3) | 17 + (F + 4) * i, (i = 1, 2, 3) |
| L-Data → Pos. pilots | — | 1199-P |

Locations of TDM 3 symbols are shown in Table 1 above in embodiment with both wide-area and local area TDM Pilot 3 symbols. The number of useful data OFDM symbols per frame is denoted by F, out of which W are used for wide-area channels and F-W for local area channels, with W ranging from 0 to F. As mentioned previously, the base line value for F can be 290, which corresponds to a baseline value of six positioning pilots, P=6. However, if positioning pilots are not utilized, at least 2 symbols should be reserved with current numerology constraints. With P=2, the number of symbols per frame can be increased from 290 to 291. One relationship between F and P is given by $$F = 291 - \frac{P-2}{4}$$

For the embodiment with only one TDM pilot 3 symbol, the locations of the pilot are shown in Tables 2 and 3.

TABLE 2

TDM pilot 3 locations, embodiment with one TDM3 pilot symbol, 10 symbols per superframe
W: # of wide area symbols per frame, P: # of positioning pilots

| Transition | Symbol Index in Superframe |
|---|---|
| W-OIS → L-OIS | 9 |
| L-OIS → W-Data | 15 |
| W-Data → L-Data | 16 + W + (F + 2) * i, (i = 0, 1, 2, 3) |
| L-Data → W-Data | 15 + (F + 2) * i, (i = 1, 2, 3) |
| L-Data → Pos. pilots | 1199-P |

TABLE 3

TDM pilot 3 locations, embodiment with one TDM3 pilot symbol, 11 symbols per superframe
W: # of wide area symbols per frame, P: # of positioning pilots

| Transition | Symbol Index in Superframe |
|---|---|
| TDM2 → W-OIS | 4 |
| W-OIS → L-OIS | 10 |
| L-OIS → W-Data | 16 |
| W-Data → L-Data | 17 + W + (F + 2) * i, (i = 0, 1, 2, 3) |
| L-Data → W-Data | 16 + (F + 2) * i, (i = 1, 2, 3) |
| L-Data → Pos. pilots | 1199-P |

In this embodiment, the values of P are restricted to multiples of 4, when 10 TDM3 pilot symbols are present. The number of data symbols in a frame is given by F=294−P/4. When 11 TDM3 pilot symbols are present, the values of P are restricted to be of the form 4n+3. The number of data symbols in a frame is then given by F=294−(P+1)/4.

It is noted that, from the description of TDM Pilot 3 symbol locations above, the TDM Pilot 3 symbols can also be interpreted as being part of the frame. In particular, the frame 200 can begin with the wide-area TDM3 symbol at the beginning and end with the local area TDM3 symbol at the end, and includes the two TDM3 symbols at the transition from wide-area to local area within the frame. With this counting, the number of symbols per frame would be F+4, that is also the factor that appears in Table 1 above. Similarly, the TDM3 symbols around the OIS can be included into the OIS, resulting in 7 wide-area OIS and 7 local area OIS symbols, with each OIS phase beginning and ending in a TDM3 symbol. Whether TDM3 symbols are considered as part of the frame & OIS is a matter of convention, but can also be driven by convenience for hardware. In an embodiment with single TPC symbol, such simple analogies are not possible, since there are in general F+2 symbols per frame, except one frame (first or last) which contains F+3 symbols.

Figure 3:
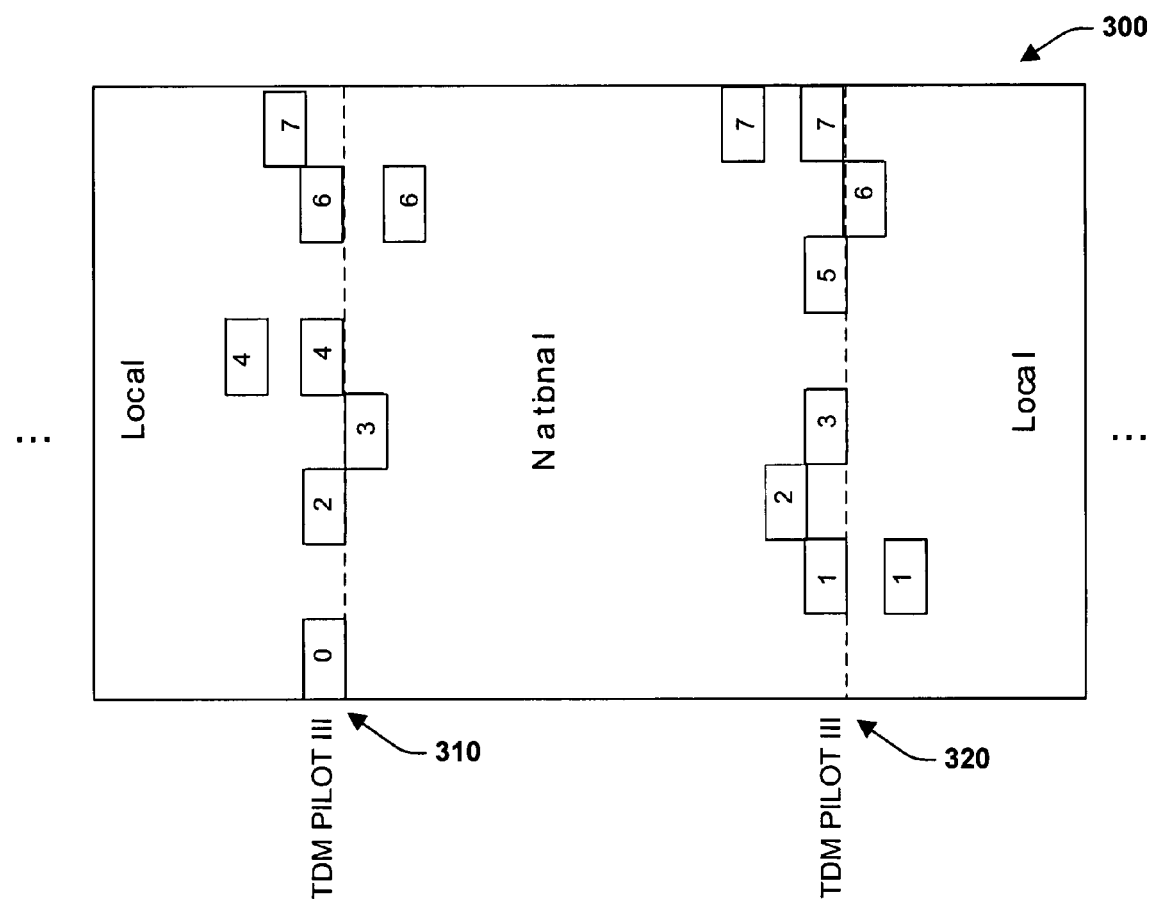
FIG. 3 illustrates an example TDM3 pilot symbol.

FIG. 3 illustrates example diagram for a TDM3 symbol 300. As shown, a left TDM Pilot 3 symbol at 310 can be located between local area and wide area channels. Which interlace of the TDM Pilot 3 310 is used for local area channel estimation can be determined by the pilot interlace of the last local area OFDM symbol so that a (0,3,6) staggering pattern is met. In the example 300, since interlace 7 is used by the last OFDM symbol of the local area channel, Interlace 2 of the TDM Pilot 3 is used for the local area channel pilot. Since the other three interlaces can be used for wide area pilots, the pilot interlace for the first wide area OFDM symbol has three choices in order to meet the (0,3,6) staggering pattern. The interlace is randomly chosen from the three possibilities based on the wide area broadcast ID to reduce the probability of pilot collision among neighbor wide area broadcasts. Since the TDM Pilot 3 has three wide area pilot interlaces (contains ¾ wide area channel information), it helps AGC converge to the wide area channel before the sampling of the first wide area OFDM symbol. The right TDM Pilot 3 symbol at 320 is located between the wide area and local area transition. The interlace used by the last wide area channel estimation is determined by the pilot interlace of the last wide area OFDM symbol such that (0,3,6) staggering pattern requirement is met. The pilot interlace of the first local area OFDM symbol is randomly chosen from three possibilities such that the (0,3,6) staggering pattern is conserved to reduce the probability of pilot collision among neighbor local area broadcasts. Since the TDM Pilot 3 has three local area pilots, it helps AGC converge to the local area channel before the sampling of the first local area OFDM symbol.

Figure 4:
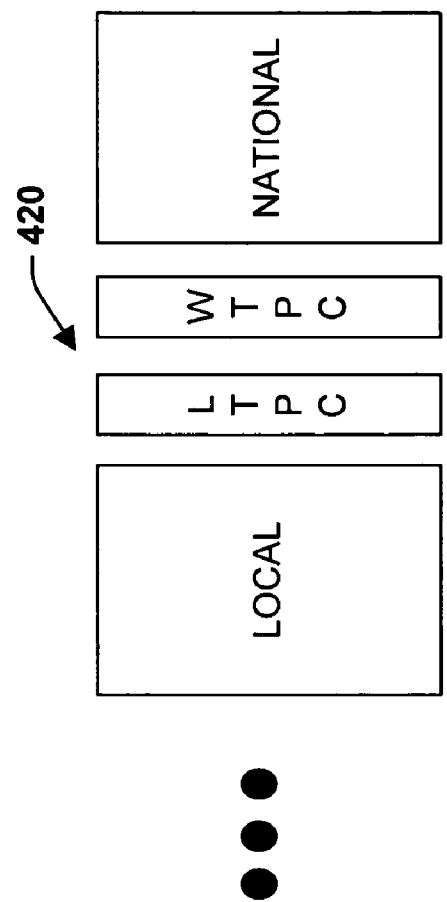
FIG. 4 illustrates example air interface considerations for a forward link only network.
Figure 4:
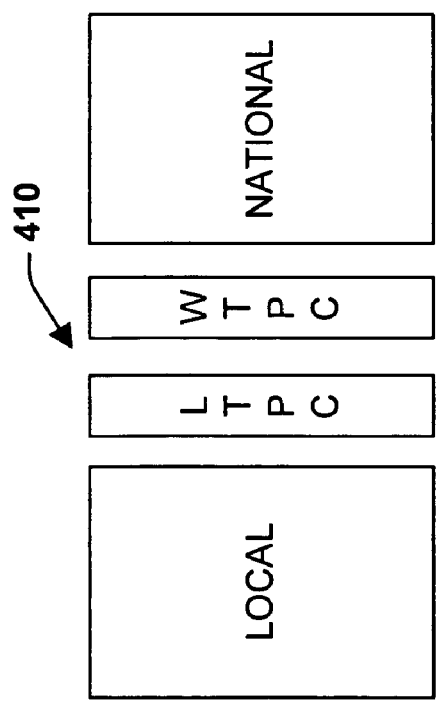

FIG. 4 illustrates an alternative embodiment, where multiple TDM Pilot 3 symbols are employed. In this embodiment, two additional pilot symbols are employed between local area and wide area data boundaries. At this is illustrated at 410 and 420 where a Local area Transitional Pilot Channel (LTPC) and a wide-area Transitional Pilot Channel (WTPC) symbols are shown as a subset of symbols. As illustrated at 420, such groupings of LTPC and WTPC can appear between local area and wide area boundaries that appear in an OFDM structure. In general, LTPC would be employed to decode the last packet of the local area data structure where, the last local area symbol may be referred to as local area symbol L. Thus, a respective receiver would process a three symbol packet that includes local area symbol L, local area symbol L−1, and the respective LTPC to determine the last local area symbol L. If decoding for the first wide area symbol N, the three symbol packet for receiver decoding would be the WTPC, the first wide area symbol N, and the next wide area symbol N+1. It is to be appreciated, that more than two TDM3 symbols can also be employed between local area and wide area data boundaries.

The symbol structure for TDM3 that is employed for LTPC and WTPC is similar to that of a normal data symbol. This includes eight slots that are occupied and the respective data symbols are all '0' before scrambling, where interlaces are a subset of carriers and slots are mapped to the interlaces in order to randomize filling of the interlaces. Scrambling seeds & masks, slot-to-interlace mapping and modulation symbol energies are similar as in a data symbol. In particular, the wide-area TDM3 symbols—WTPC are scrambled using a wide-area ID in the seed, and the local area TDM3 symbols—LTPC are scrambled using both the wide-area and local area IDs in the seed. In general, the receiver does not need to determine the locations of TDM3 in one example modern implementation. Nevertheless, sending information regarding the TDM3 locations requires very little overhead and could be useful as an upgrade path for wake-up time tracking and timing synchronization based on TDM 3.

Figure 5:
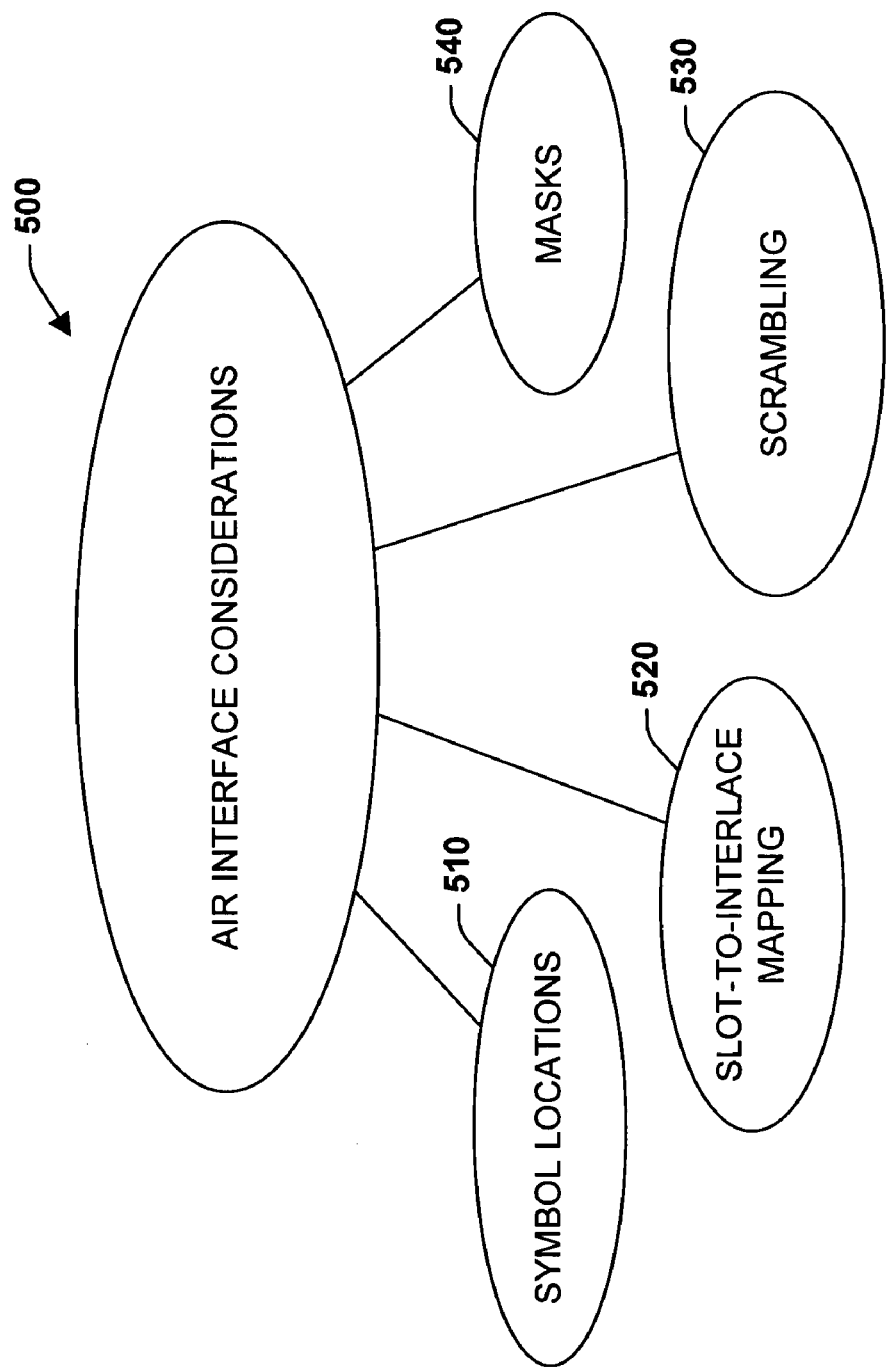
FIG. 5 illustrates additional air interface considerations for a forward link only network.

FIG. 5 illustrates example air interface considerations 500 for forward link only networks. Proceeding to 510, symbol locations are considered where a packet is analyzed and it is determine where the symbols are placed within the respective packet. At 520 of FIG. 5, slot-to-interface mapping considerations are described. Considering the embodiment with one TDM pilot 3 symbol at the boundaries, typically, each of the TDM pilot 3 symbols has the same structure. The first four slots are used in each OFDM symbol, i.e., slots 0, 1, 2, 3. A special slot-to-interlace mapping is chosen for TDM3 such that these slots are mapped to the even interlaces 0, 2, 4, 6. Restricting TDM3 to occupy the even interlaces simplifies timing synchronization based on this symbol. Specifically, let $f_{TDM3}(n,s)$ denote the slot-to-interlace mapping for TDM3, where n is the symbol index and s is the slot index. Then, define the mapping as:

$$f_{TDM3}(n,0) = f_{Prev}(n,0)$$

$$f_{TDM3}(n,s) = [f_{TDM3}(n,s-1)+2] \bmod 8, \; s=1,2,3 \quad \text{Equation 1}$$

Here, $f_{Prev}(n,s)$ denotes the slot-to-interlace mapping function for the previous multiplex. Thus, for the wide-area to local area transitions, $f_{Prev}(n,s)$ is the slot-to-interlace mapping for wide-area OFDM symbols, and for local area to wide-area transitions and $f_{Prev}(n,s)$ is the slot-to-interlace mapping for local area OFDM symbols. It is noted that, in the following discussions, the "pilot" interlace in TDM 3 corresponds to the pilot for the previous multiplex. The succeeding multiplex could also require a pilot interlace for time-filtering and this pilot interlace would be one of the remaining three interlaces. Slot 0 is generally not associated with the pilot interlace for the succeeding multiplex. One reason is that, instead of using the pilot interlace alone, the succeeding symbol can use the channel estimation from all three interlaces in TDM 3 to bootstrap the time-filtering process. This boot-strapping is similar to that done between TDM 2 and the first wide-area OIS symbol.

One aspect behind Equation 1 above is the following: since slot 0 is always the pilot slot, the first equation facilitates that pilot staggering is un-interrupted for the previous multiplex. For example, if the pilot arrives at interlace 3 in the last wide-area symbol in a frame, it will appear at interlace 6 in TDM 3. Similarly, if the pilot arrives at the last local area symbol is at interlace 7, the pilot will be on interlace 2 in TDM 3. From these examples, it is clear that to allow TDM 3 symbols to have even interlaces, the following constraint applies:

W is Odd

Note that the constraint above is required only for the embodiment with a single TDM pilot 3 at the area boundaries. When more than one TDM pilot 3 symbol is allowed at the area boundaries, W can take any value. This limitation on W for the embodiment with only one TDM pilot 3 at the boundaries ensures that $f_{Prev}(n-1,0)$ is odd and $f_{TDM3}(n,0)$ is even. When the pilot interlace corresponding to slot 0 is chosen, slots 1, 2, 3 are mapped so that they fall on the remaining even interlace. For example, if the pilot interlace is 2, slots 1, 2, 3 map to interlaces 0, 4, 6. One way to achieve this is given by the second equality in Equation 1, where it cycles through the remaining even interlaces starting from the pilot interlace. Such a mapping is convenient for hardware implementation.

In one aspect, the mapping is defined only for the first four slots. From an implementation viewpoint, if all the slots need to be mapped, slots 4 to 7 can be mapped to the odd interlaces in an arbitrary manner, perhaps using a look-up table. Alternatively, a deterministic map can be calculated, e.g., slot 4 is mapped to interlace 1, slot 5 to interlace 3 and so on where: $f_{TDM3}(n,s)=2(s-4)+1, \; s=4,5,6,7$ At 530 of FIG. 5, scrambling issued are described. Since TDM 3 occupies the even interlaces, the scrambling is similar to TDM 2 which also occupies the even interlaces. One difference is that the scrambling for TDM 2 is based on the wide-area ID (or the WOI ID) alone, while the scrambling for TDM 3 employs the wide area and local area Id's. Specifically, 500 constellation symbols for each slot can be generated by generating a sequence of 1000 bits using a 20 tap linear feedback shift register (LFSR) based scrambler. Subsequently, the constellation symbols are created by mapping each pair of adjacent bits into a QPSK alphabet. The seed of the scrambler for TDM 3 based on the same principle used to currently set the seed for the OFDM symbols in the OIS and Data channel. The scrambler seed can be 20 bits in length and of the form $[d_3 d_2 d_1 d_0 c_3 c_2 c_1 c_0 b_0 a_{10} a_9 a_8 a_7 a_6 a_5 a_4 a_3 a_2 a_1 a_0]$.

For the slots of TDM 3, $b_0$ is set to '1' and $a_{10} \ldots a_0$ is set to the OFDM symbol index in a super frame, as specified in Table 2. Further, $d_3 d_2 d_1 d_0$ is set to the 4 bit wide area ID. The value of $c_3 c_2 c_1 c_0$ depends on the slot index and the nature of the transition, wide area→local area or local area→wide area. These values are summarized in Table 2 below:

TABLE 4

TDM pilot 3 scrambler seed portion, embodiment with one TDM pilot 3 symbol at the boundaries

| Transition | Slot 0 $c_3 c_2 c_1 c_0$ | Slots 1, 2, 3 $c_3 c_2 c_1 c_0$ |
|---|---|---|
| Wide area → Local area | Default LID value used for wide area transmissions | LID corresponding to local area |
| Local Area → Wide Area | LID corresponding to local area | Default LID value used for wide area transmissions |

Note that it is generally only required that the slots used for transmitting the wide area pilots use the same settings for the WID and the LID as other wide area slot transmissions. Similarly, slots used for transmitting local area pilots are generally required to use the same settings for the WID and LID as other local area slot transmissions.

At 540, mask considerations are discussed. The scrambling operation described above is determined by the seed as well as the mask used. The mask may depend on the slot index where eight masks are listed. The masks corresponding to slots 0-3 for TDM 3 can be used as well. It can be appreciated that other choices for the mask are also possible.

Figure 6:
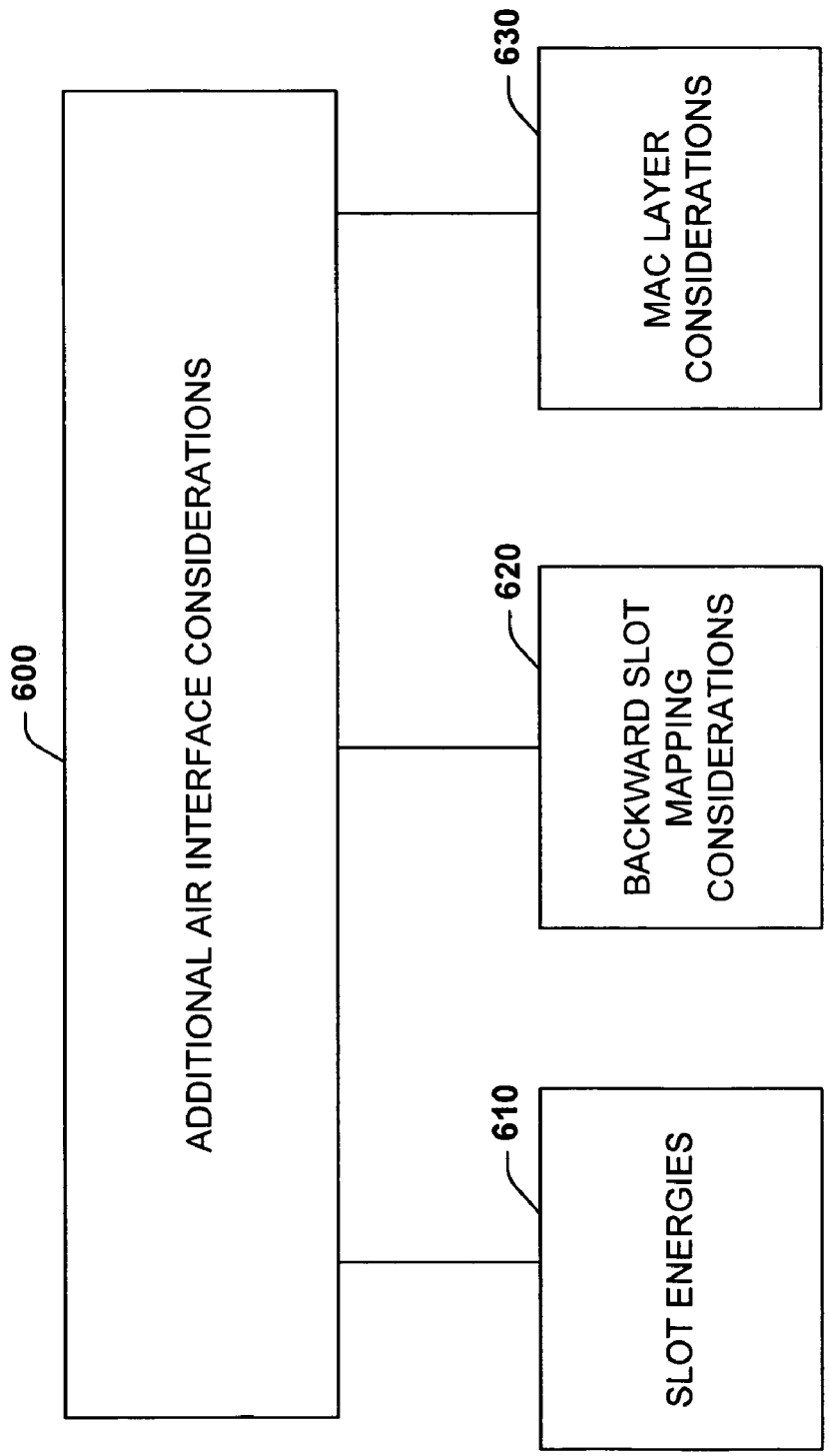
FIG. 6 is a diagram illustrating example network layers for a wireless system.

FIG. 6 illustrates additional air interface considerations 600. Proceeding to 610, slot energies are considered. Since TDM 3 uses four of eight slots, the energy of each slot can be doubled to keep the same overall OFDM symbol energy. However, the slots for TDM 3 appear in two groups—one pilot slot (0) for the previous multiplex and three slots (1,2,3) used for the succeeding multiplex. Thus, it may not be clear that all the slot energies should be scaled by same factor. Some of the issues related to this scaling are:

AGC operation: The total energy should be kept the same as other OFDM symbols so that the AGC at the receiver does not see an energy dip for this symbol alone. Let this total energy be E.

Time-filtering for Previous multiplex: In order not to modify the coefficients of the time-filter for the last symbol of a wide area/local area multiplex, then the energy for slot 0 should be E/8.

Time-filtering for Succeeding multiplex: The pilot slot for the succeeding multiplex should also have energy E/8 if the time-filter is not to be modified. However, this may require that the transmitter identify the pilot slot for the succeeding multiplex. In one current scheme, there is no distinction between slots 1, 2 and 3 and this pilot slot is identified by its interlace rather than its slot number. Hence, one may need to go back from the pilot interlace number to the pilot slot number using Equation 1 above. But, if pilot slot can be identified, channel estimation can be unaware of the presence of TDM 3 before it.

Timing synchronization for Succeeding multiplex: Timing synchronization for the succeeding multiplex can be based on the interlaces corresponding to slots 1, 2 and 3. Since this operation is specific to TDM 3, it can be easily modified to account for any energy allocation. But, the receiver should be aware of the TDM 3 symbol index.

2k samples vs 4k samples for FFT at Rx: The final slot energy scaling also depends on how the FFT for TDM 3 is performed at the receiver. If 4k samples are used in getting the 512 FFT for each interlace (as done for normal data demodulation), all of the slot energy is captured. On the other hand, if only 2k samples are used (as done for TDM 2), the slot energy is effectively halved, but the receiver needs to know that the TDM 3 symbol index so that it uses only 2k samples. Based on these considerations, three energy allocations are possible for slot 0 to slot 3: 1)

$$1)\ \left\{\frac{E}{4},\frac{E}{4},\frac{E}{4},\frac{E}{4}\right\};\ 2)\ \left\{\frac{E}{8},\frac{7E}{24},\frac{7E}{24},\frac{7E}{24}\right\}$$

$$\text{and } 3)\ \left\{\frac{E}{8},\frac{E}{8},\frac{3E}{8},\frac{3E}{8}\right\}.$$

But to keep the design simple, the first allocation is recommended. It makes the effective slot energy to be E/8, so the time-filters for the previous or the succeeding multiplexes need not be changed.

Proceeding to 620 of FIG. 6, backward slot mapping considerations are described. Slots 0-7 are generally mapped into interlaces for the wide-area OIS, FDM pilot and Data OFDM symbols. In addition, the mapping can be extended "backwards" to be applicable to TDM2, and wide-area and local-area identification symbols. The mapping uses the OFDM symbol index within a super-frame, with values ranging from 1-1199, but repeats itself every 56 OFDM symbols. In one example, denote the slot-to-interlace map as $f_{WOI}(n,s)$, where n is the OFDM symbol index in a super-frame and s is the slot index. Note that slot 0 is the pilot in this scheme, and $f_{WOI}(n, 0)$ is the pilot interlace. Under the constraint that time-filtering for channel estimation operates for the previous and the succeeding multiplex, the slot-to-interlace map for the local area multiplex should be changed as well.

One reason for changing the slot-to-interlace mapping can be seen through an example. Consider at the transition between the wide area multiplex and the local area multiplex. Let $n_0$ represent the OFDM symbol index of TDM 3 at this transition. Also, consider that the last wide area OFDM symbol has a pilot at interlace 3, i.e., $f_{WOI}(n_0-1,0)=3$. Then, $f_{WOI}(n_0, 0)=6$, and slot 0 of TDM 3 maps to interlace 6. This map allows time-filtering for the last wide area symbol. But, if continued to use the same mapping for the local area multiplex, the pilot interlace for the first local area symbol would be $f_{WOI}(n_0+1,0)=1$. Time-filtering for the first local area symbol may require pilots at interlace 6, 1 and 4 in symbols $n_0$, $n_0+1$, $n_0+2$ respectively and may not be possible, since interlace 6 in TDM 3 has already been used as the pilot for the wide area. One of slots 1,2 or 3 as the pilot would be used for the local area symbols.

Let the new slot-to-interlace mapping function for the local area symbols be denoted by $f_{LOI}(n,s)$. From the above example, it can be generalized to the general restriction on the new mapping. Essentially, the wide area pilot and local area pilot are on different interlaces in TDM 3. Hence, $[f_{WOI}(n_0, 0)-f_{LOI}(n_0, 0)]$ mod 8=2,4, or 6. One simple way to facilitate this is to derive the local area map as a time-shift of the wide area map. Any one of the following six maps would work $f_{LOI}(n,s)=f_{WOI}(n+2m,s)$, m=±1,±2,±3 The wide area map can be shifted by an even number (but not a multiple of 8) of OFDM symbols so that the pilot interlaces differ by an even number. For simplicity, the following map is recommended: $f_{LOI}(n,s)=f_{WOI}(n+2,s)$ Equation 2.

The slot-to-interlace map defined by Equation 2 applies to the local area OIS channel, the local area data channel and the local area FDM pilot channel. In addition to using the new slot-to-interlace map, the scrambling operation should be modified slightly for the local area OIS, data and FDM pilot channels. As described above, the 20 bit scrambler seed has a 4 bit wide area and a 4 bit local area portion. For wide area channels, the wide area portion is set to the WID and local area portion is set to the default LID value . For local area data/OIS/FDM pilot, the local area portion is the LID of the transmitter while the wide area portion is still set to the WID.

Proceeding to 630 of FIG. 6, MAC layer considerations are described. One possible change at the MAC layer is a provision for transmitting information regarding the boundary between wide-area and local area OFDM symbols and the boundary between local area symbols and positioning pilots, if any. This information should be transmitted to facilitate timing synchronization for the succeeding multiplex and also help in scale factor issues for time-filtering at the boundary. It is noted that sending boundary information can be equivalent to sending the variable TDM 3 locations. From Table 2 above, the locations of TDM 3 are determined if W is known (the number of wide-area data OFDM symbols) and P, the number of positioning pilots used.

Figure 7:
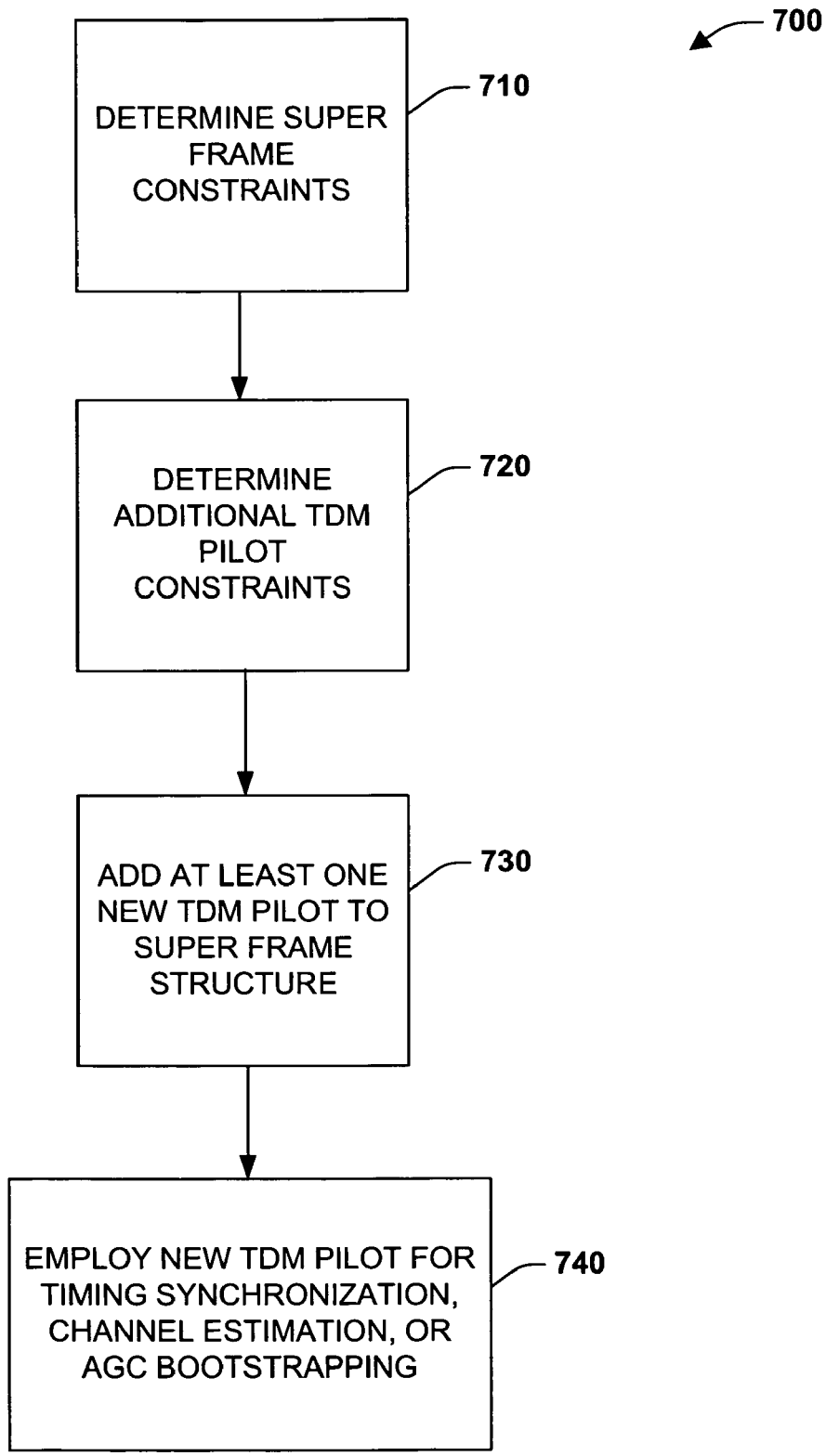
FIG. 7 illustrates an example pilot symbol process for a wireless system.

FIG. 7 illustrates a pilot symbol process 700 for wireless systems. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 710, one or more super frame constraints are determined in view of employing additional TDM pilot symbols. As noted above this could include symbol locations, slot mapping considerations, scrambling considerations, mask considerations, slot energy considerations, backward compatibility considerations, and impacts on current MAC layer frameworks. As can be appreciated, modifications supplied at a transmitter of an OFDM broadcast would be considered and accounted for at the receiver end. At 720, additional TDM pilot constraints are considered. In one aspect, this may include determining how many additional symbols to add to a conventional symbol set of TDM1 and TDM2.

Figure 8:
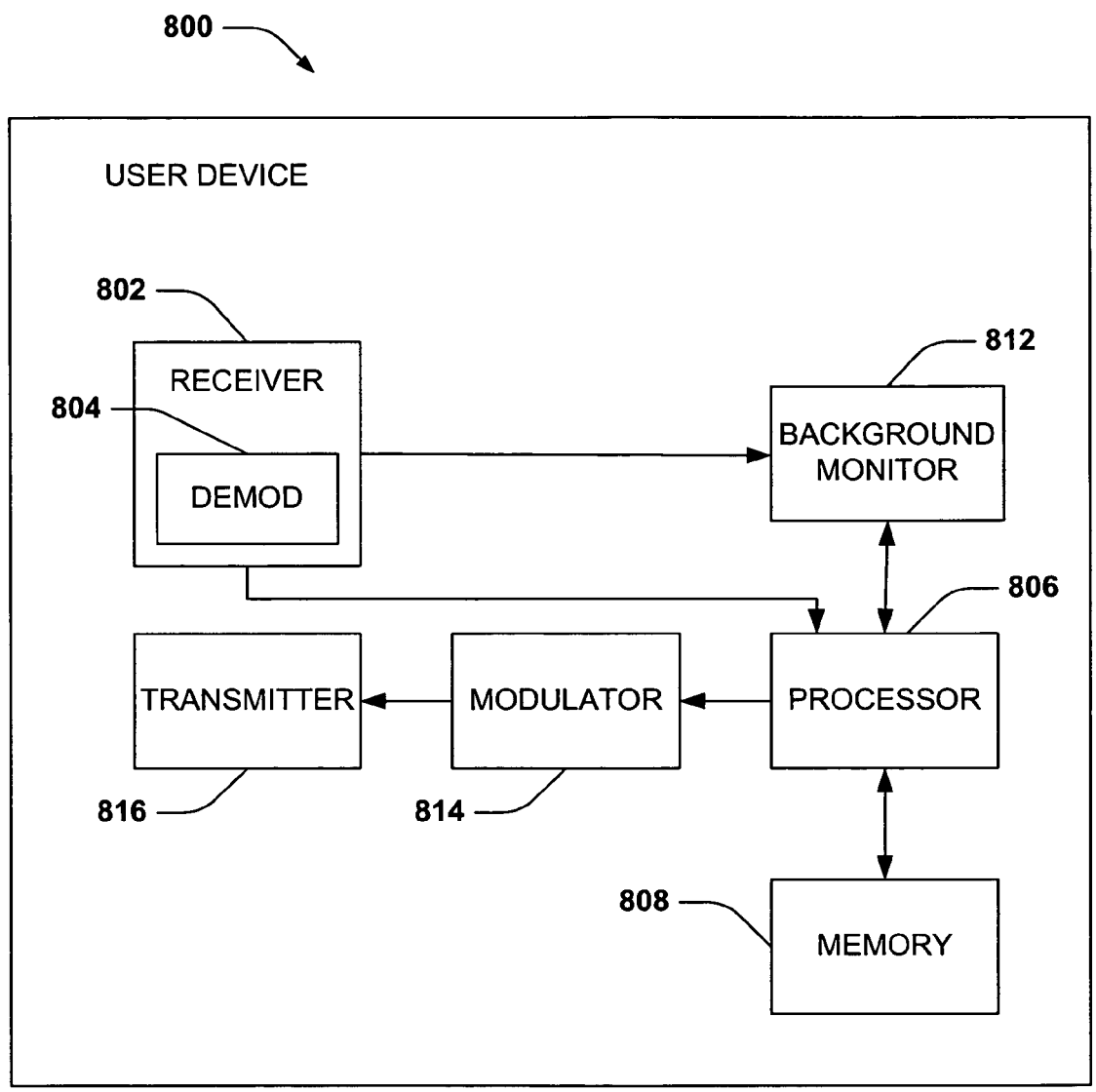
FIG. 8 is a diagram illustrating an example user device for a wireless system.

Generally, one additional TDM3 may be included but more than one symbol can be added to the super frame and associated specification. Other considerations include one or more of the constraints determined at 710 for the overall super frame structure. At 730, at least one additional TDM pilot symbol is added to a super frame structure. As noted above, a first additional pilot generally follows TDM2, where subsequent additional pilots are employed for separation between local area and wide area information broadcasts. As can be appreciated, other configurations are possible. At 740, when the additional pilots have been added to the super frame they aid in timing synchronization, channel estimation, and/or AGC bootstrapping at the receiver FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. A demodulator 804 can demodulate and provide received pilot symbols to a processor 806 for channel estimation. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800. User device 800 can additionally comprise memory 808 that is operatively coupled to processor 806.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Figure 9:
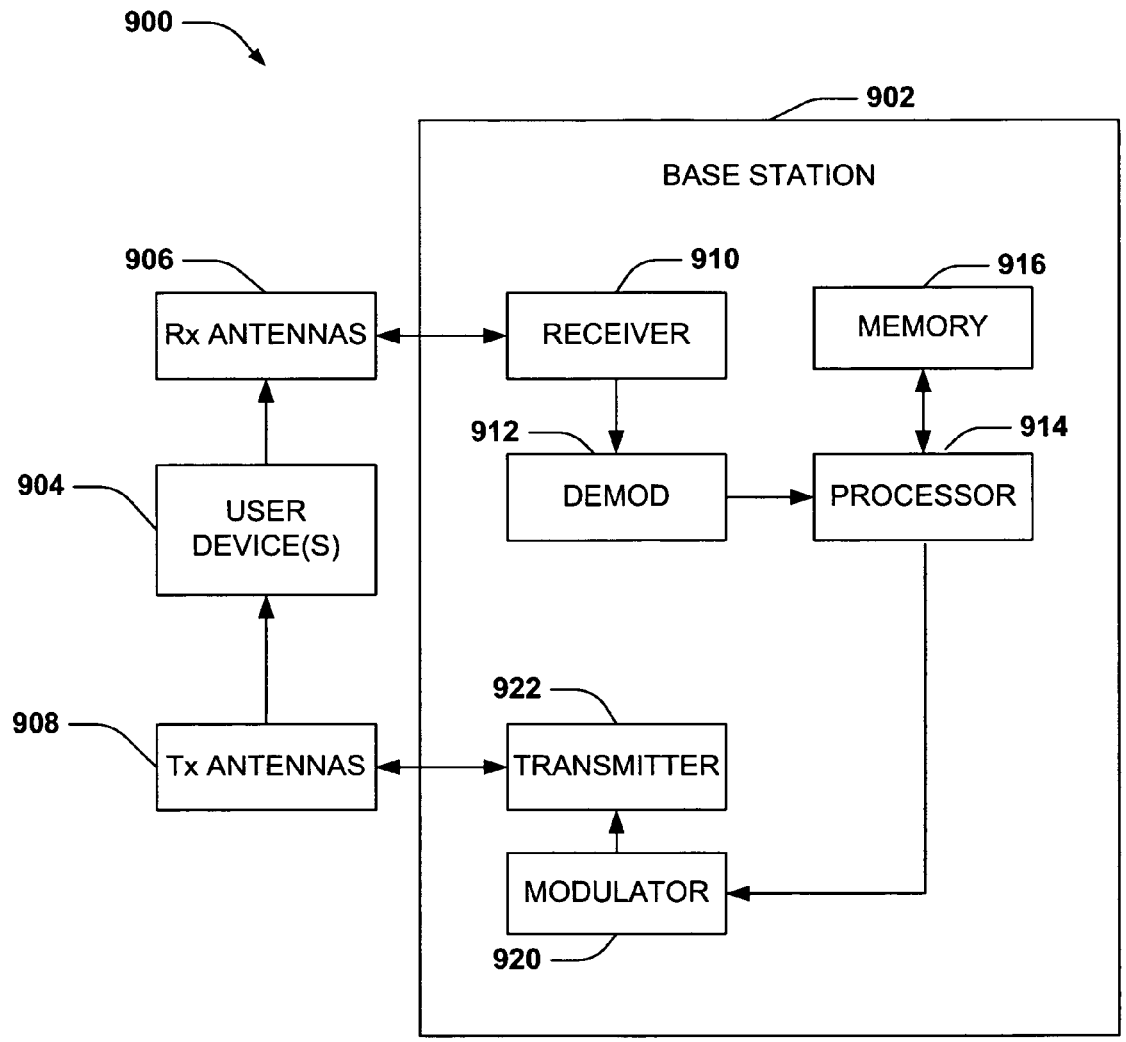
FIG. 9 is a diagram illustrating an example base station for a wireless system.

FIG. 9 illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above, and which is coupled to a memory 916 that stores information related to user ranks, lookup tables related thereto, and/or any other suitable information related to performing the various actions and functions set forth herein. A modulator 922 can multiplex a signal for transmission by a transmitter 924 through transmit antenna 908 to user devices 904. Base station 902 can interact with a user device 904 that provides information and employs a decoding protocol in conjunction with a non-linear receiver.

Figure 10:
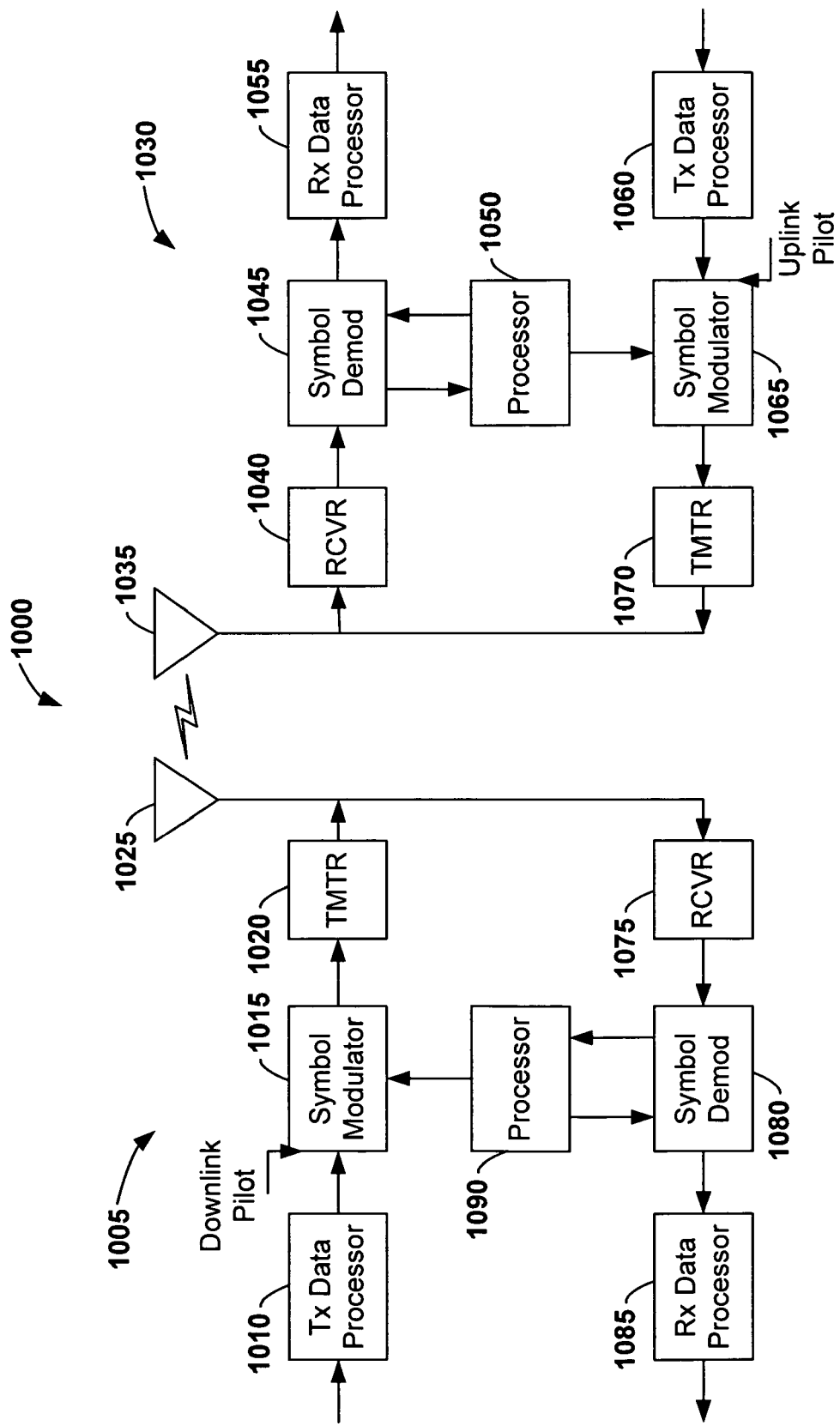
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented in an apparatus for multicasting information in a multi-carrier communication system, the method comprising:
   generating a transmission block;
   inserting at least one TDM pilot symbol at a transition located between wide area and local area waveforms to facilitate decoding of the transmission block; and
   applying a staggered interlace pattern to the at least one TDM pilot symbol.

2. The method of claim 1, further comprising employing a multi-carrier communication system that utilizes OFDM (Orthogonal Frequency Division Multiplexing).

3. The method of claim 1, further comprising employing the at least one TDM pilot symbol for channel estimation.

4. The method of claim 1, further comprising employing the at least one TDM pilot symbol for time synchronization or for automatic gain control (AGC) bootstrapping.

5. The method of claim 4, further comprising locating the at least one TDM pilot symbol between local area and wide area data broadcasts.

6. The method of claim 1, where the staggered interlace pattern is selected from the set of (0,3,6,1,4,7,2,5) or (2,6).

7. The method of claim 1, further comprising inserting at least 10 TDM pilot symbols per superframe.

8. The method of claim 1, further comprising determining at least one slot-to-interlace mapping for the at least one TDM pilot symbol.

9. The method of claim 1, further comprising determining a set of mask values associated with each slot in the at least one TDM pilot symbol.

10. A method implemented in an apparatus for multicasting information in a multi-carrier communication system, the method comprising:
    generating a transmission block;
    inserting at least one TDM pilot symbol at a transition located between wide area and local area waveforms to facilitate decoding of the transmission block;
    determining at least one slot-to-interlace mapping for the at least one TDM pilot symbol; and
    employing an odd number of wide area symbols W to facilitate that the at least one TDM pilot symbol uses even interlaces, for a packet having one TDM pilot symbol at local and wide area boundaries.

11. A method implemented in an apparatus for multicasting information in a multi-carrier communication system, the method comprising:
    generating a transmission block;
    inserting at least one TDM pilot symbol at a transition located between wide area and local area waveforms to facilitate decoding of the transmission block; and
    determining a scrambling parameter for the at least one TDM pilot symbol based on a wide area identifier (WID) and a local area identifier (LID).

12. The method of claim 11, further comprising determining a transition from a wide area to local area where a slot 0 is scrambled using a default value for the LID, and slots 1, 2, and 3 are scrambled using the LID corresponding to a local area.

13. The method of claim 11, further comprising determining a transition from a local area to wide area where slots 1,2 and 3 are scrambled using a default value for the LID, and slot 0 is scrambled using the LID corresponding to a local area.

14. A method implemented in an apparatus for determining pilot information, the method comprising:
  determining at least one additional TDM pilot symbol for a wireless network;
  applying a staggered interlace pattern to the at least one TDM pilot symbol;
  transmitting the at least one additional TDM pilot symbol to at least one receiver at transitions from wide area to local area waveforms; and
  adjusting energy of one or more slots associated with the at least one additional TDM pilot symbol to facilitate receiver processing.

15. The method of claim 14, further comprising balancing total energy of the at least one additional TDM pilot signal to aid automatic gain control in the receiver.

16. The method of claim 14, further comprising setting an energy level for a pilot slot for a preceding multiplex operation to be a total energy divided by 8.

17. The method of claim 14, further comprising setting an energy level for a pilot slot for a succeeding multiplex operation to be a total energy divided by 8.

18. The method of claim 14, further comprising scaling a slot energy in view of a determined processing window length at a receiver.

19. The method of claim 14, further comprising determining at least one of the following energy allocations for pilot slots 0-3:

1) $\left\{\frac{E}{4}, \frac{E}{4}, \frac{E}{4}, \frac{E}{4}\right\}$; 2) $\left\{\frac{E}{8}, \frac{7E}{24}, \frac{7E}{24}, \frac{7E}{24}\right\}$ and 3) $\left\{\frac{E}{8}, \frac{E}{8}, \frac{3E}{8}, \frac{3E}{8}\right\}$;

where E is the total symbol energy.

20. The method of claim 14, further comprising applying a slot mapping constraint from the at least one additional TDM pilot symbol to a previous TDM pilot symbol.

21. The method of claim 14, further comprising deriving a slot to interlace map for a local area as a time shift of a slot to interlace map for a wide area.

22. The method of claim 14, further comprising transmitting information regarding a location of boundaries between wide area data and local area data.

23. A wireless communications apparatus, comprising:
  a memory that includes a component to receive at least one TDM pilot symbol with a staggered interlace pattern at a boundary between wide area and local area data in a superframe; and
  at least one processor associated with a receiver that decodes the super frame over a wireless network.

24. An apparatus for operating base station in a wireless network, comprising:
  a memory that includes a component to transmit at least one additional TDM pilot symbol with a staggered interlace pattern over a symbol subset according to an OFDM broadcast; and
  at least one processor associated with a transmitter that encodes the super frame for the OFDM broadcast.

25. A method implemented in an apparatus for transmitting data, the method comprising:
  generating a data packet having at least one TDM pilot symbol with a staggered interlace pattern associated with a local waveform boundary and at least a second pilot symbol associated with a wide-area waveform boundary; and
  transmitting the TDM pilot symbol and the second pilot symbol in the data packet.

* * * * *